(12) United States Patent
Chen

(10) Patent No.: US 7,994,978 B2
(45) Date of Patent: Aug. 9, 2011

(54) SATELLITE INFORMATION OPERATION METHOD OF GPS DEVICE

(75) Inventor: Hung-Sheng Chen, Taipei County (TW)

(73) Assignee: Altek Corporation, Hsinchu (TW)

( * ) Notice: Subject to any disclaimer, the term of this patent is extended or adjusted under 35 U.S.C. 154(b) by 179 days.

(21) Appl. No.: 12/405,350

(22) Filed: Mar. 17, 2009

(65) Prior Publication Data

US 2010/0164793 A1 Jul. 1, 2010

(30) Foreign Application Priority Data

Dec. 26, 2008 (TW) ................................ 97150968 A

(51) Int. Cl.
*G01S 19/37* (2010.01)
(52) U.S. Cl. ................................. 342/357.77
(58) Field of Classification Search .............. 342/357.77
See application file for complete search history.

(56) References Cited

U.S. PATENT DOCUMENTS

| | | | | |
|---|---|---|---|---|
| 4,814,711 A | * | 3/1989 | Olsen et al. ................... | 324/331 |
| 4,972,431 A | * | 11/1990 | Keegan .......................... | 375/150 |
| 5,701,328 A | * | 12/1997 | Schuchman et al. .......... | 375/139 |
| 5,757,851 A | * | 5/1998 | Saegusa ......................... | 375/229 |
| 6,964,008 B1 | * | 11/2005 | Van Meter, III ............... | 714/807 |
| 2003/0088689 A1 | * | 5/2003 | Alexander et al. ............ | 709/232 |
| 2003/0152151 A1 | * | 8/2003 | Hsieh et al. ............... | 375/240.26 |
| 2007/0147252 A1 | * | 6/2007 | Kotzin .......................... | 370/235 |
| 2008/0282039 A1 | * | 11/2008 | Burckart et al. .............. | 711/141 |

* cited by examiner

*Primary Examiner* — Thomas Tarcza
*Assistant Examiner* — Frank McGue
(74) *Attorney, Agent, or Firm* — Rabin & Berdo, P.C.

(57) ABSTRACT

A satellite information operation method of a GPS device includes following steps. An antenna module is provided, so as to receive a satellite signal. A signal processing circuit is provided, so as to perform an analog-to-digital conversion on the satellite signal and obtain a plurality of first digital data. A memory with a comparison table stored therein is provided, and the comparison table records corresponding relations between a plurality of second digital data and a plurality of return values. A CPU is provided, which groups the first digital data in sequence by using a bit number of any second digital data in the comparison table, obtains each of the second digital data consistent with each group of first digital data through comparison, and looks up a corresponding return value according to each of the second digital data obtained through comparison to continue the operation according to the obtained return value.

5 Claims, 1 Drawing Sheet

SATELLITE INFORMATION OPERATION METHOD OF GPS DEVICE

CROSS-REFERENCE TO RELATED APPLICATIONS

This non-provisional application claims priority under 35 U.S.C. §119(a) on Patent Application No(s). 097150968 filed in Taiwan, R.O.C. on Dec. 26, 2008 the entire contents of which are hereby incorporated by reference.

BACKGROUND OF THE INVENTION

1. Field of the Invention

The present invention relates to a satellite information operation method, and more particularly to a satellite information operation method of a global positioning system (GPS) device.

2. Related Art

A global position system (GPS) device utilizes a basic triangular positioning principle of satellites, that is, three-dimensional spatial coordinates of the position of the GPS device are calculated through measuring a distance between each satellite and the GPS device according to the position of each satellite. When the GPS device receives a satellite signal, a distance between the position of the GPS device and the satellite is obtained through a conversion carried out by an internal microprocessor. When the GPS device receives two satellite signals, the GPS device calculates the planar coordinate information thereof. When the GPS device receives three satellite signals, the GPS device obtains the coordinate information of the position thereof. Generally, a GPS device utilizes more than 4 satellite signals to determine the position and height thereof. When the GPS device receives 5 to 6 satellite signals continuously, more accurate positioning information can be obtained. Currently, 32 satellites are ejected and running in the space, which are distributed uniformly on six orbit planes. An inclination angle of the orbit is about 55°. The satellites have a satellite height of about 20,183 km, and a satellite cycle of 11 hours and 58 minutes. That is to say, each satellite orbits the earth twice along the same path in each day. This design enables users on the earth to view at least 4 satellites any time anywhere.

Generally, the GPS device obtains the satellite information by accumulating all the sampling points at a unit of 1 ms according to a sampling frequency of wireless signals, which, however, requires a large amount of operations. For example, the received satellite signals are converted into a series of digital data containing "0" and "1" after an analog-to-digital conversion. Then, an XOR operation is performed on the digital data, carrier frequencies, and C/A codes, and then the obtained results are accumulated, so as to obtain the satellite information. In other words, as the digital data is increased, the operation time is prolonged as well.

SUMMARY OF THE INVENTION

In view of the above problems, the present invention is directed to a satellite information operation method of a global positioning system (GPS) device, in which an operation result corresponding to each group of digital data is obtained by looking up a comparison table, so as to reduce the data operations of the satellite information, thereby improving the operation speed of the satellite information.

Therefore, the present invention provides a satellite information operation method of a GPS device, which includes the following steps. An antenna module is provided, so as to receive a satellite signal. A signal processing circuit is provided, so as to perform an analog-to-digital conversion on the satellite signal and obtain a plurality of first digital data. A memory with a comparison table stored therein is provided, and the comparison table records corresponding relations between a plurality of second digital data and a plurality of return values. A central processing unit (CPU) is provided, which groups each first digital data in sequence by using a bit number of any second digital data in the comparison table, obtains the second digital data consistent with each group of first digital data through comparison, and looks up a corresponding return value according to the second digital data obtained through comparison, so as to continue the operation according to the obtained return value.

In the satellite information operation method of the GPS device, the digital data of various arrangements are grouped according to a specific bit number (for example, 8 bits, or 16 bits), and each group of digital data is operated in advance to obtain a corresponding operation result for each group of digital data. Then, a corresponding relation between each group of digital data and the operation result thereof is stored in the comparison table. Then, an actually received satellite signal is processed to obtain a plurality of digital data, and the operation result corresponding to each group of digital data is obtained through looking up the pre-established comparison table, so as to reduce the data operations of the satellite information, thereby improving the operation speed of the satellite information.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1:
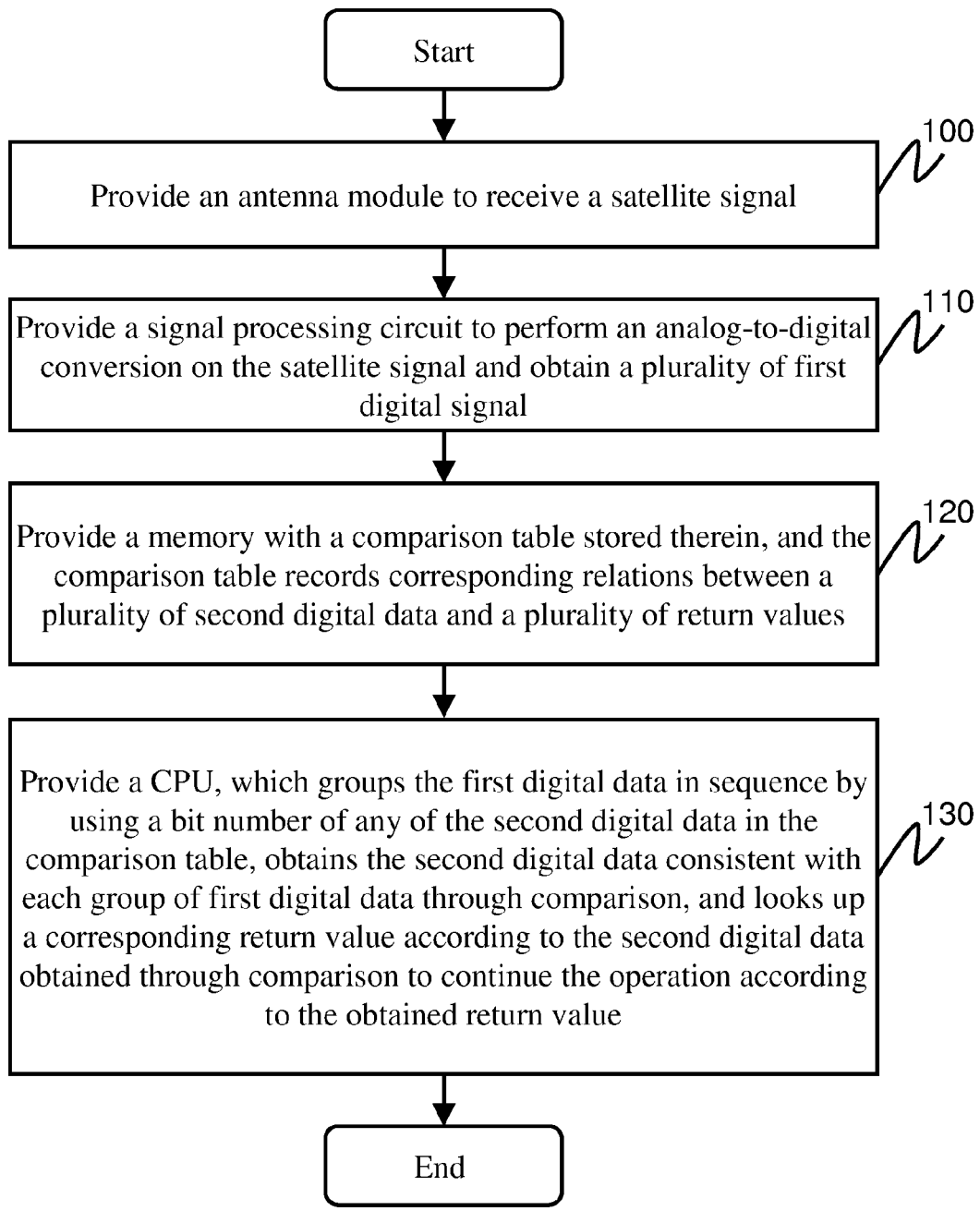
FIG. 1 is a flow chart of a method according to the present invention.

FIG. 1 is a flow chart of a method according to the present invention. Referring to FIG. 1, a satellite information operation method of a global positioning system (GPS) device according to the present invention includes the following steps.

First, an antenna module is provided, so as to receive a satellite signal (Step 100). The antenna module includes a patch antenna, a passive band-pass filter, a low noise amplifier (LNA), a mixer, and an intermediate frequency (IF) filter. The patch antenna receives the satellite signal; next, the passive band-pass filter filters out-of-band interference signals or noises from the required signal; then, the LNA amplifies the signal; and then the mixer reduces the radio frequency signal to an IF band. A high frequency signal and a signal with a low frequency band are generated after the mixer is used to perform a frequency reduction on the signal, so that the high frequency signal needs to be filtered out by the IF filter to retrieve the analog IF signal.

Thereafter, a signal processing circuit is provided, so as to perform an analog-to-digital conversion on the satellite signal, and obtain a plurality of first digital data (Step 110). If an intensity of the analog satellite signal (i.e., the analog IF signal) received in Step 100 cannot reach a conversion level of the signal processing circuit, an automatic gain control (AGC) may be used to appropriately amplify the satellite signal to satisfy a dynamic range of the signal processing circuit. After the satellite signal is processed through the analog-to-digital conversion, a series of first digital data containing 0 and 1 is obtained, and the first digital data may have a format of, for example, "11100001111000001111000 . . . ".

Then, a memory with a comparison table stored therein is provided, and the comparison table records corresponding relations between a plurality of second digital data and a plurality of return values (Step 120). The memory may be, for example, a non-volatile memory, a read-only memory, or a flash memory.

The content of the comparison table is shown in Table 1 as follows.

TABLE 1

| List value | Second Digital Data | Return Value |
|---|---|---|
| 0 | 00000000 | 0 |
| 1 | 00000001 | 1 |
| 2 | 00000010 | 1 |
| 3 | 00000011 | 2 |
| 4 | 00000100 | 1 |
| 5 | 00000101 | 2 |
| ... | ... | ... |
| ... | ... | ... |
| 252 | 11111100 | 6 |
| 253 | 11111101 | 7 |
| 254 | 11111110 | 7 |
| 255 | 11111111 | 8 |

The second digital data in Table 1 is in a data format of binary code. The bit number for any second digital data is 8 bits. The bit number of each of the second digital data in Table 1 is the same. In addition, the bit number of the second digital data may also be designed as 16 bits.

Then, a central processing unit (CPU) is provided, which groups each first digital data in sequence by using the bit number of any second digital data in the comparison table, obtains the second digital data consistent with each group of first digital data through comparison, and looks up a corresponding return value according to the second digital data obtained through comparison, so as to continue the operation according to the obtained return value (Step 130). The first digital data is formed by a series of 0 and 1, and thus every continuous 8 or 16 bits in the first digital data is classified as one group. Then, the second digital data consistent with each group of first digital data is obtained through comparison, so as to reduce the data operations of the satellite information. Then, a return value corresponding to the second digital data is obtained by looking up Table 1, so as to continue the operation of the satellite information according to the obtained return value. In other words, 8 to 16 times of accumulation operations are replaced by executing a program of looking up a comparison table, thereby improving the operation speed of the satellite information.

To sum up, in the satellite information operation method of the GPS device according to the present invention, the digital data of various arrangements are grouped according to a specific bit number (for example, 8 bits, or 16 bits), and each group of digital data is operated in advance to obtain a corresponding operation result for each group of digital data. Then, a corresponding relation between each group of digital data and the operation result thereof is stored in the comparison table. Then, an actually received satellite signal is processed to obtain a plurality of digital data, and the operation result corresponding to each group of digital data is obtained through looking up the pre-established comparison table, so as to reduce the data operations of the satellite information, thereby improving the operation speed of the satellite information.

What is claimed is:

1. A satellite information operation method of a global positioning system (GPS) device, comprising:
providing a movable antenna module for receiving a satellite signal, the antenna module having a position;
providing a signal processing circuit, so as to perform an analog-to-digital conversion on the satellite signal, and obtain a plurality of first digital data;
providing a look-up memory with a comparison table stored therein, wherein the comparison table records corresponding relations between a plurality of second digital data and a plurality of return values; and
providing a central processing unit (CPU), wherein the CPU groups the first digital data in sequence by using a bit number of any of the second digital data in the comparison table, obtains the second digital data consistent with the grouped first digital data through comparison, looks up corresponding return values according to the obtained second digital data, and determines the position of the antenna module using the obtained return values.

2. The satellite information operation method of a GPS device according to claim 1, wherein the antenna module comprises a patch antenna, a passive band-pass filter, a low noise amplifier (LNA), a mixer, and an intermediate frequency (IF) filter.

3. The satellite information operation method of a GPS device according to claim 1, wherein the memory is a non-volatile memory.

4. The satellite information operation method of a GPS device according to claim 1, wherein the bit number of any of the second digital data in the comparison table is 8 bits.

5. The satellite information operation method of a GPS device according to claim 1, wherein the bit number of any of the second digital data in the comparison table is 16 bits.

* * * * *